(12) United States Patent
Whitesmith et al.

(10) Patent No.: US 6,577,238 B1
(45) Date of Patent: Jun. 10, 2003

(54) RFID DETECTION SYSTEM

(75) Inventors: Howard William Whitesmith, Cambridge (GB); Timothy John Palmer, Cambridgeshire (GB); Alan Edward Ball, Cambridgeshire (GB)

(73) Assignee: Tagtec Limited, Cambridge (GB)

( * ) Notice: Subject to any disclaimer, the term of this patent is extended or adjusted under 35 U.S.C. 154(b) by 0 days.

(21) Appl. No.: 09/786,425

(22) PCT Filed: Sep. 28, 1999

(86) PCT No.: PCT/GB99/03213
§ 371 (c)(1),
(2), (4) Date: Mar. 1, 2001

(87) PCT Pub. No.: WO00/19235
PCT Pub. Date: Apr. 6, 2000

(30) Foreign Application Priority Data

Sep. 28, 1998 (GB) .............................................. 9821046

(51) Int. Cl.$^7$ ..................................... G08B 13/14
(52) U.S. Cl. ............... 340/572.1; 340/573.1; 340/693.9; 340/572.8; 340/568.1; 340/825.49; 340/10.1; 342/42; 342/47; 342/95; 342/106; 342/107; 342/109; 342/113; 342/114; 342/139; 342/146; 342/118
(58) Field of Search ................... 340/572.1, 573.1, 340/693.9, 572.8, 568.1, 825.49, 10.1; 342/42, 47, 95, 106, 107, 109, 113, 114, 139, 146, 118

(56) References Cited

U.S. PATENT DOCUMENTS

| | | | | |
|---|---|---|---|---|
| 5,119,072 A | * | 6/1992 | Hemingway | 340/573 |
| 5,589,821 A | * | 12/1996 | Sallen et al. | 340/573 |
| 5,936,527 A | * | 8/1999 | Isaacman et al. | 340/572.1 |
| 6,028,518 A | * | 2/2000 | Rankin et al. | 340/572.1 |
| 6,097,301 A | * | 8/2000 | Tuttle | 340/693.9 |

* cited by examiner

Primary Examiner—Daniel J. Wu
Assistant Examiner—Tai T. Nguyen
(74) Attorney, Agent, or Firm—George R. McGuire; Hancock & Estabrook, LLP

(57) ABSTRACT

A system 100 is disclosed for monitoring the position of one or more RFID tags 201. The system has a detector 301 incorporating circuitry 304 for detecting changes in the range of an RFID tag 201 from the detector and for triggering an alarm 401 if a detected change in range of an RFID tag 201 exceeds a predetermined threshold or if the RFID radio tag cannot be detected by the detector 301. Range may be detected, for example, by measuring the time of a returned radio signal from a tag 201, by measuring the strength of a returned radio signal from a tag, or by detecting changes in a periodic interval at which energy is transmitted by a tag.

15 Claims, 3 Drawing Sheets

RFID DETECTION SYSTEM

REFERENCE TO RELATED APPLICATION

The present application is the U.S. National Stage application based upon International Application Serial No. PCT/GB99/03213.

BACKGROUND OF THE INVENTION

1. Field of Invention

The present invention relates to radio frequency identification (RFID) tagging and, more specifically, to the use of RFID transponders or "tags" in position monitoring and location.

2. Description of Prior Art

Current tag systems detect the movement or presence of a tag as it comes into range of a detector and have been used for access control (eg in the form of personal access cards) or for security control (eg being attached to articles for sale in retail outlets). However, such systems provide only a relatively crude or simple measure of security and rely on passage of the tag past a related detector to monitor movement.

RFID transponders, such as the Supertag™ transponders developed by CSIR & BTG are known for providing automatic data capture and dissemination of ID codes from tagged objects and provide advantages over conventional tagging systems such as bar codes, magnetic stripes and the like, particularly as they utilise so-called anti-collision technology which enables identification of individual tags among groups of tags without requiring singulation of the tags.

Such tags may comprise a single, integrated circuit chip bonded to an antenna which may be a flat, printed antenna, and can be incorporated in labels and the like and attached to objects to provide identification of the objects. The Supertag™ technology employs a reflection tag principle in which radio waves incident on the tag are modulated with the data content of the tag and re-broadcast for a given period of time to the interrogator. Following reading of the tag data, the tag is muted for another predetermined period of time to allow other tags in the range of the interrogator to be identified or counted. Such tags receive their operating energy by means of radiated electromagnetic energy and are known as so-called "passive radio tags" and therefore require no attached power source such as battery. The energy required to operate from RF energy is provided from a suitable "interrogator" or reader, referred to hereafter as a "detector".

SUMMARY OF THE INVENTION

The present invention recognises that RFID tags can be utilised to provide location information and hence may be used to provide a simple security system for objects.

According to the present invention therefore, there is provided a system for monitoring the position of one or more RFID tags, the system comprising:

one or more detectors incorporating means for receiving signals from the RFID tag for detecting changes in the range of an RFID tag from the detector or detectors; and control means comparing the signals received from the RFID tag at different times to detect a change in range of the RFID tag and triggering an alarm if a detected change in range exceeds a predetermined threshold.

The detector or detectors preferably measure the time of a returned radio signal from a tag to determine the range of the tag, but, alternatively, the strength of a returned radio signal or its waveform shape may be determined by the detector(s) to determine the range of a tag.

The system may also have means for recording the time of a change in range of a tag and may include plural detectors may also have means for calculating the location of one or more radio tags having individual codes.

The system may include tags which have circuitry arranged to emit short bursts of RF energy at periodic intervals, and the or each detector including circuitry for detecting changes in the periodic interval at which energy is transmitted by the or each tag. The or each detector preferably includes circuitry for predicting the time of receipt of a burst of energy from a tag and for triggering an alarm if the time of actual receipt varies from the predicted time of receipt by more than a predetermined interval and/or if the rate of change in the periodic interval at which energy is transmitted by a tag is outside a predetermined range. Alternatively, or additionally, the detector(s) may include circuitry for analysing changes in the rate of receipt of bursts of energy from a tag and for triggering an alarm if the rate of change is more than a predetermined level.

A system according to the invention may be utilised, for example in the home, for ensuring the security of components such as valuable equipment such as televisions, personal computers and the like, or other valuable items such as paintings, furniture and the like which may be relatively easily stolen by removal from their normal location, movement out of range of a detector being recognised by the central controller and an appropriate alarm signal given.

One example of such a system comprises one or more transmitter-receivers (or detectors) and one or more RFID tags, the transmitter-receiver transmitting radio frequencies coded so that the RFID tag can recognise a point in time at which to respond. In the case of a single transmitter-receiver and a single RFID tag, the time delay between the transmission of the time code and reception by the transmitter-receiver of the signal from the RFID tag is a function of both the time delays in the equipment and the propagation time of the signals travelling to and from the RFID tag. The total time is measured and stored within the transmitter-receiver. It is not necessary to know the value of any of the components of the total time.

This process is repeated and successive times are compared. The difference in times can be due to either changes in the time delay in the equipment or changes in the propagation time of the radio frequency signal. As the time delay in the equipment will change only slowly, time differences will be due to change in the propagation delay, which in turn will be due to changes in distance.

The equipment can thus sense a change in distance between the transmitter-receiver and the RFID tag which can be used to initiate an alarm or for some other purpose.

In the case of a single transmitter-receiver and two or more RFID tags the transmitter-receiver transmits and each RFID tag responds in the way previously described. The signal received by the transmitter-receiver from the RFID tags will have time and amplitude characteristics which are a function of the relative positions of the transmitter-receiver and the RFID tags. The transmitter-receiver captures the time-amplitude 'picture' of the returned signal. The process is repeated and successive time-amplitude 'pictures' are compared. As previously described the variations will be due to changes in the relative positions of the transmitter-receiver and RFID tags. The equipment can thus sense a change in distance between the transmitter-receiver and by two or more RFID tags which can be used to initiate an alarm or for some other purpose.

However, it is possible that an RFID tag could be moved in an arc without changing the distance between the transmitter-receiver and the RFID tag and without changing the time or time-amplitude 'picture' captured by the transmitter-receiver.

This can be circumvented by using two or more transmitter-receivers each operating as previously described with one or more RFID tags, but displaced in such a way that movement of an RFID tag in two or three dimensions can be sensed. The transmitter-receivers operate in a synchronised manner so that changes in relative distance between each transmitter-receiver and the RFID tags can be separately compared.

While the example described above may be operable with relatively small numbers of tags operating in a confined area, it may be advantageous to utilise other methods of range monitoring with larger numbers of tags and areas of operation.

In a further example of a system according to the invention, the tag is arranged to transmit a short burst, or "chirp", of RF energy at periodic intervals. This is achieved by providing the tag with, for example, an on-board capacitor arranged to store electromagnetic energy received by the tag's antenna from an RF transmitter forming part of a detector in the system. Although the exact frequency of RF energy within a chirp is determined by the tag components, the repetition rate (chirp rate) of the individual tag is determined by the intensity of the electromagnetic field incident upon the tag and the tag's orientation. As the tag is moved within the field, the power received by the tag varies, causing the chirp rate to alter.

The chirps may be detected by a base station which is capable of analysing the chirp rate. The base station is then be able to predict the time of the next chirp for each tag. If the chirp is not received within the correct time window, then the tag can be deemed to have moved and an alarm can be sounded.

As in the first example system, the detector incorporates a transmitter which is relatively simple. It is only required that the transmitter send a continuous RF signal. No modulation is required for basic functionality, although, as an enhancement, it might be used to vary the average power received by a tag, this would alter its chirp rate and could possibly give a more accurate position location by analysing the variation of the chirp rate with modulation depth. The transmitter and antenna design are such that the maximum permissible field can be obtained if required, thereby giving maximum range. The international standards specify the maximum field that is allowed (often given as a measured value at 10 m).

The use of a separate transmit coil (antenna) within the tag allows the tag to transmit on a frequency that is well spaced from the incident RF field. This can make the base-station receiver design more straightforward. However, it is possible to use only one coil for both transmit and receive.

As the chirp rate of each tag in a system will be dependent upon the incident field at the tag, tags at different distances chirp at different rates and they can therefore be differentiated from one another. One technique therefore is to perform a Fourier transform on the pulse train received at the detector. This yields frequency peaks for each of the tags which enables the chirps from each tag to be identified. The time for the next chirp can then be predicted and, if it does not appear within its expected time window then the alarm can be triggered. It would not matter if two or more individual chirps arrived at the same time, as the FFT (Fast Fourier Transform) could decode this as long as each tag has a different chirp rate. As the rate at which the tag receives energy will be dependent upon the orientation of the tag as well as the distance from the transmitter(s), changing either of these will alter the chirp rate. Therefore, if two tags should happen to be chirping at the same rate, this can be easily corrected by adjusting the orientation of one of the tags during set-up.

While it has been proposed, above, that the tags are powered by the incident RF energy, increased range might be obtained by providing a battery within the tag.

A potential enhancement to the basic system would be to analyse the RF frequency of a chirp and possibly its decay envelope. This would enable the individual tags to be specifically identified. For instance, it might be possible to say that tag# five is the furthest away and is twice as distant as tag #two. It might also be possible for the user to customise the tags and give them particular characteristics that the system controller could identify, e.g. the decay envelope could be controlled by cutting or removing parts of the tag which would change a resistor or capacitor in the transmit coil circuit. Some of the current commercial RFID tags have 'intelligent' capabilities. This enables them to accept, store, and retransmit digital data. The individual tags can then be uniquely identified. This capability could thus be added to "chirping" tags if desired.

Thermal changes will have an effect upon the chirping characteristics, however, these would be relatively long term and would tend to affect all of the tags. Such effects could be compensated for in software without compromising the integrity of the system. Of course, if a tag is attached to a piece of equipment which heats up in use, such as a television, then only the characteristics of that tag would change. This could be dealt with in several ways, the alarm threshold for each tag could be different or, as the rate of change would still be much longer than that occurring if the tag is moved rapidly, it could again be filtered out. The system could also be given the ability to 'learn' the typical long term behaviour of each tag and could compensate for it, this could possibly be implemented by the use of a neural network. False alarms could also be dealt with by such a method. This would tend to decrease the number of false alarms and lead to greater user confidence in the system.

It would be possible to increase the coverage by having several transmit coils and but maybe only one receiver. As the tag chirp rate has a strong dependence upon distance and orientation, it should be possible to set up many more clearly identifiable tags over a much wider range than is achievable with a single transmitter. As the chirp rate of the tag depends upon the amount of the electromagnetic field which is coupled into the coil, this being determined not only by the field strength, which is distance dependent, but also by the angular orientation of the tag with respect to the field, the system is therefore sensitive to rotational movement of the tag about its own axis. An example of the implication of this is illustrated by considering a tag that has been placed on a door close to the hinge. The rotation of the door when opening would change the orientation of the tag to the field and hence would dramatically alter the chirp rate. An intruder alarm could then be triggered by this change.

Rather than transmitting, the tag could send its chirp back by using the reflection technique already used in many existing tags. It is the detection of the chirp rate that is essential to this technique, not how the chirp is sent.

Example applications of the system, the key functional features here being orientation detection, ease of installation and portability, are as follows:

Car security; placing a controller and antenna within a vehicle and then fitting tags to each door would give a very effective alarm system. Opening any door could set off the alarm. Installation would be simple with none of the additional wiring that can be a major cost for car manufacturers.

Portable alarms/personal security; a small portable system could easily be attached to hotel room doors and windows, and indeed to any valuable items it is desired to protect within a room.

It may also be appreciated that since it is the change in range of a tag from a detector which triggers an alarm, movement of a detector while a tag is stationary may also trigger an alarm. This may be used to advantage to protect equipment or articles capable of housing a detector, alarm and power supply as an alternative to fitting them with tags. For example, a briefcase or laptop computer may be capable of being fitted with a detector and alarm so that if it is removed from the vicinity of a tag located with its owner, an alarm may sound. This is particularly useful for protecting equipment and articles which are frequently carried by a person as it is, in most cases, impractical for a person to carry the detector, power supply and alarm.

BRIEF DESCRIPTION OF THE DRAWINGS

Two examples of systems according to the invention will now be described with reference to the accompanying drawings, in which.

DETAILED DESCRIPTION

Figure 1:
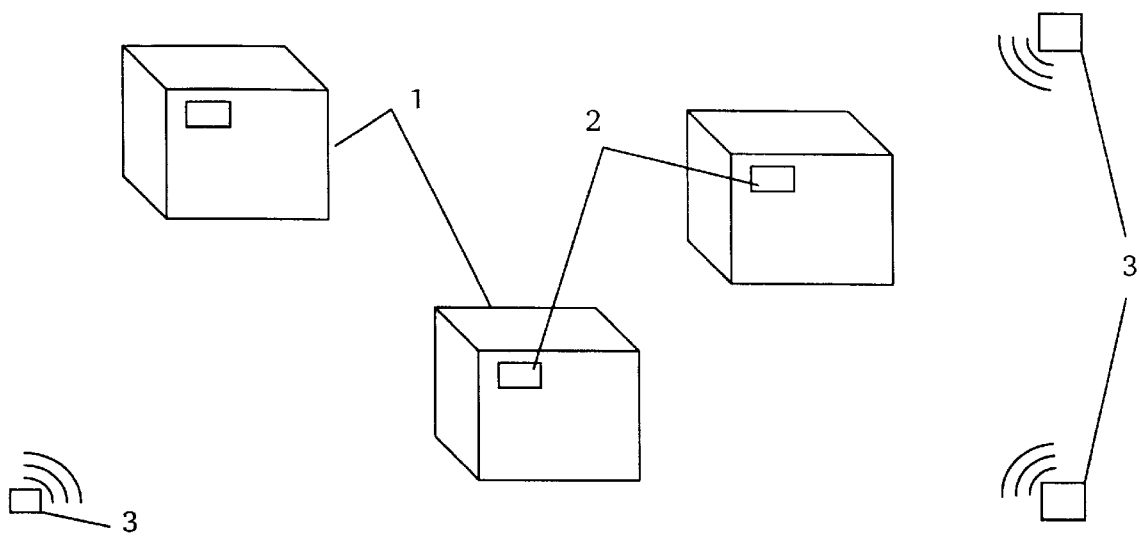
FIG. 1 is a diagram of a first system comprising plural tags and transmitter-receivers.

FIG. 1 there are shown a number of articles 1 on which passive radio tags 2 are located and three transceiver detectors 3 which are arranged to provide a field of coverage for the articles. Movement of an article and hence its tag out of the field of cover is detected and an alarm issued.

Figure 2:
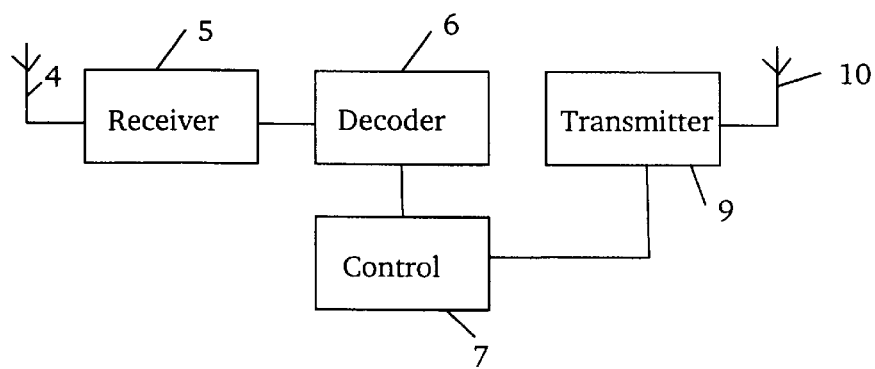
FIG. 2 illustrates the operative components of a passive radio tag for such a system.

FIG. 2 illustrates the operative components of a passive radio tag for use in a system according to the present invention. A signal from a transceiver (not shown in FIG. 2) is passed from an antenna 4 to a receiver 5 and the signal decoded in a decoder 6. The signal is decoded to extract timing information which is subsequently used by a microprocessor control mechanism 7 to determine the interval after which the passive radio tag transmission commences from a transmitter 9 via a further antenna 10. The transmission may be encoded with data stored in the passive radio tag including such data as the identity of the passive radio tag and is received by the transceivers 3.

Figure 3:
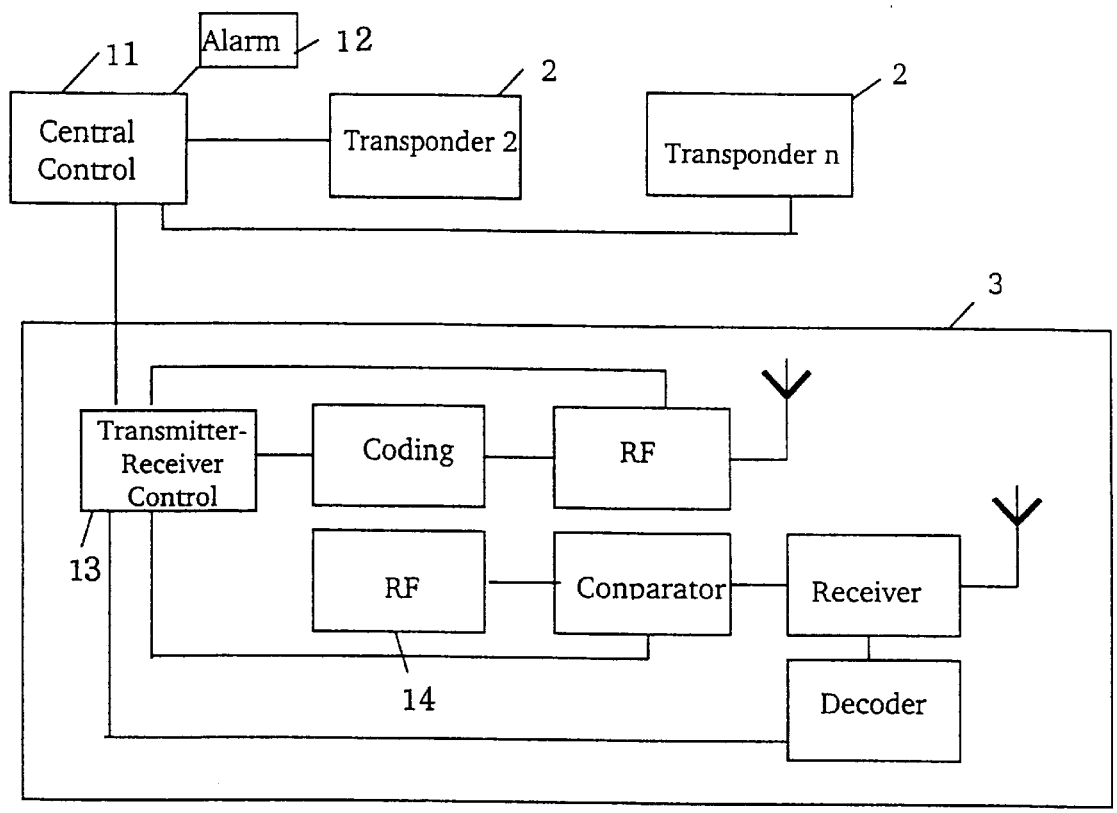
FIG. 3 illustrates, in block diagram form, the components of a transmitter-receiver and a connected central control in such a system.

FIG. 3 shows one a number of transceivers 3 employed in the system, connected to a central control 11 which in turn may be connected to an alarm 12. The transceivers each have a control 13 which periodically initiates a transmission to the passive radio tags 2 in the system. The return transmissions from the passive radio tags are synchronised by coding the transmissions from the transceivers or by starting, stopping or interrupting the transmission from the transceivers. The transmission from a passive radio tag is compared with an RF oscillator 14 or another clock to determine the time elapsed since the initiation of the transmission from the transceiver. The elapsed time and the decoded data if any from the passive radio tag are stored in the transceiver control 13 and compared with equivalent data from successive cycles to determine whether or not the passive radio tag has moved. If movement is detected which is judged by the central control 11 to be indicative of unallowable movement, then the central controller initiates an alarm.

Figure 4:
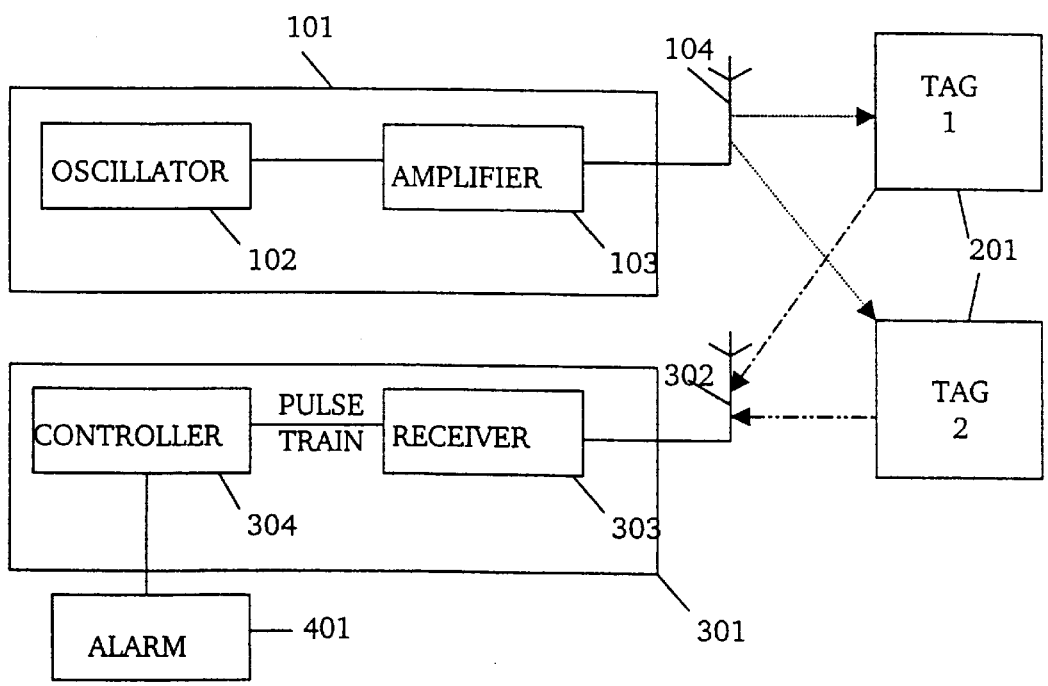
FIG. 4 is a diagram of a second system comprising plural tags and a single transmitter-receiver.
Figure 5:
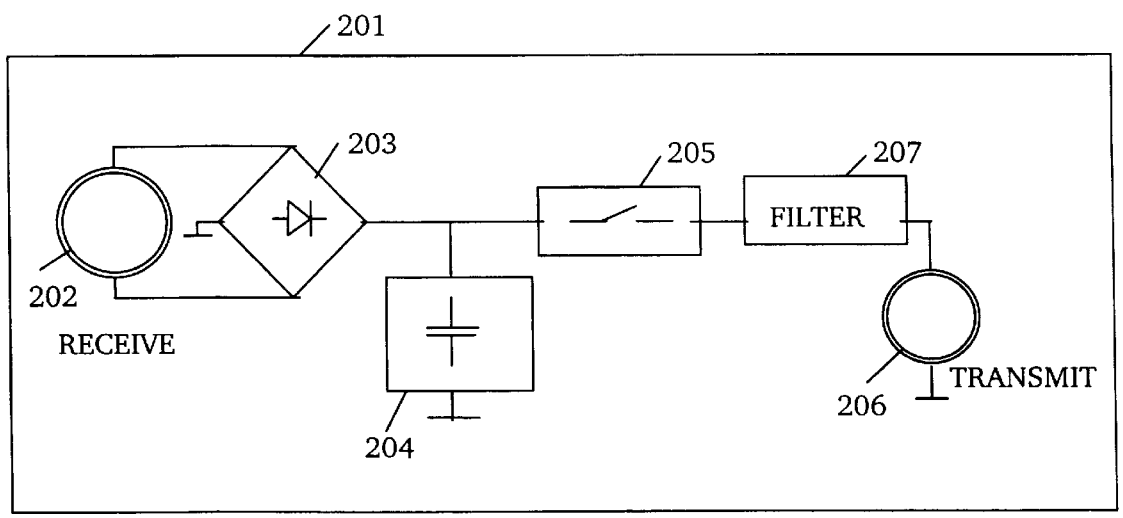
FIG. 5 is a block-diagram of the internal components of a tag for use with the second system.

The second system, illustrated in FIGS. 4 and 5 utilizes tags with an on-board capacitor to provide a short burst or "chirp" of RF energy which can be detected by a detector. The system 100 is illustrated generally in FIG. 4. The system includes a transmitter 101 which has a power source (not shown), an oscillator 102 and an amplifier 103 which directs a signal at radio frequencies (RP) to an antenna 104. From the antenna, the RF energy is radiated into the area covered by the system and energy is picked up by tags 201. As described below, the tags 201 store the energy and emit short bursts ("chirps") of RF energy (at a different frequency to that of the transmitter 101) to one or more detectors 301 which include an antenna 302, a receiver 303 and a controller 304 which is connected to an alarm 401.

The main function of the controller 304 is to analyse the frequencies that are present in the received signal or pulse train in such a way as to be able to predict the arrival time of the next chirp from any particular tag. If the chirp from that tag does not arrive within a given time window, then the controller can take the appropriate action, such as sounding the alarm. Although a purely analogue system could be created, the controller of the preferred example uses a Digital Signal Processor (DSP) connected to an Analogue to Digital Converter (ADC). In addition, the DSP could also be connected to some form of user interface such as an LCD display and keyboard if desired. The ADC converts the received analogue signal to a digital pulse train and the DSP then performs a Fast Fourier Transform (FFT) upon that pulse train and then uses the results from the FFT to predict the time of the next chirp from each tag. The controller 304 may also perform a number of other functions, these may include adaptive algorithms to compensate for thermal/environmental changes, as well as general system control, i.e. monitoring any input from the user and the display of information on, say, an attached computer system monitor.

At each tag 201, the incident RF energy is received by an input coil or antenna, 202. This energy is stored, preferably by rectification and/or voltage multiplication in a rectifier 203 and the subsequent charging of a capacitor 204. When a predetermined amount of energy has been received, a switch 205 is triggered and the energy is fed into a transmit coil or antenna 206. This periodically generates an RF pulse whose frequency is determined by the self-resonance of the coil 206 and the storage capacitor 204. The tags 201 continue to chirp with the same periods (dependant on location within the electromagnetic field of the transmitter 101) thus providing an indication of non-movement. The addition of a filter 207 may enable closer control of the frequency which may desirable to ensure that the appropriate standards are met with assurance. This may also help to extend the operable range by putting the same amount of energy into a narrower band, thereby allowing a receiver with a tighter bandwidth to be used.

As with the first example, any movement of a tag is detected by the detector 301, in this case because the chirp rate will change when the radiant energy impinging on the tag changes as a result of its movement, and this can be arranged to trigger the alarm 401.

Referring to FIG. 5, to convey tag specific information to the controller, the switch unit 205 or the filter 207 could be replaced with an intelligent switch which would be able to modulate the signal being generated by the transmit coil.

Individual tags may be capable of being programmed by the controller if the intelligent switch mentioned above is given the capability to detect a modulation of the incoming signal; this may be used to place digital information in the switch module and hence program the tag. This programmed information would then control the behaviour of the tag and the messages that it transmitted. This gives an 'adaptive' tag that can be modified by the controller. This has a number of applications, including ID as stated above and chirp frequency modification to allow for a greater tag density.

What is claimed is:

1. A system for monitoring the position of at least one RFID tag, said system comprising:
    at least one RFID tag;
    at least one detector incorporating means for receiving signals from said RFID tag for detecting changes in the range of said RFID tag from said detector; and
    control means for comparing signals sequentially received from said RFID to detect a change in range of said RFID tag, and for triggering an alarm if said detected change in range of said RFID tag exceeds a predetermined threshold.

2. A system according to claim 1, wherein said detector is arranged to measure the time of a returned radio signal from said RFID tag to determine the range of said RFID tag.

3. A system according to claim 1, wherein said detector is arranged to determine the strength or waveform shape of a returned radio signal from said RFID tag to determine the range of said RFID tag.

4. A system for monitoring the position of at least one RFID tag, said system comprising:
    at least one RFID tag;
    at least one detector incorporating means for receiving signals from said RFID tag for detecting changes in the range of said RFID tag from said detector;
    control means comparing the signals received from said RFID tag at different times to detect a change in range of said RFID tag, and triggering an alarm if a detected change in range of said RFID tag exceeds a predetermined threshold; and
    said RFID tag including circuitry having means for emitting short bursts of RF energy at periodic intervals.

5. A system according to claim 4, further including an RF transmitter arranged to transmit RF energy to said RFID tag, wherein the said RFID tag includes circuitry arranged to store energy received from said transmitter and to provide energy for transmitting said short bursts of RF energy.

6. A system according to claim 5, wherein said detector includes circuitry for detecting changes in the periodic interval at which said energy is transmitted by said RFID tag.

7. A system according to claim 4, wherein said RFID tag includes a receiving antenna and a transmitting antenna.

8. A system according to claim 4, wherein said control means is additionally arranged to trigger said alarm if said RFID tag cannot be detected by said detector.

9. A system according to claim 4, wherein said detector includes circuitry for detecting changes in the periodic interval at which said energy is transmitted by said RFID tag.

10. A system according to claim 9, wherein said detector includes circuitry for predicting the time of receipt of a burst of energy from said tag and for triggering an alarm if the time of actual receipt varies from the predicted time of receipt by more than a predetermined interval.

11. A system according to claim 9, wherein said detector includes circuitry for analyzing changes in the rate of receipt of bursts of energy from said RFID tag and for triggering an alarm if the rate of change is more than a predetermined level.

12. A system according to claim 9, wherein said detector includes circuitry for triggering an alarm if the rate of change in the periodic interval at which energy is transmitted by said RFID tag is outside a predetermined range.

13. A system according to claim 9, wherein said transmitter includes circuitry arranged to vary the average power transmitted and hence received by said RFID tag to alter the periodic interval at which said RFID tag emits bursts of energy.

14. A system for monitoring the position of an RFID tag, comprising:
    a transmitter for transmitting RF energy;
    an RFID tag including circuitry having means for receiving said RF energy and transmitting short bursts of RF energy at periodic intervals based on the relative position and orientation of said RFID tag relative to said transmitter;
    a detector for receiving said bursts transmitted from said RFID tag; and
    a controller interconnected to said detector for determining a change in range of said RFID tag and triggering an alarm if said change in range of said RFID tag exceeds a predetermined threshold.

15. A method for monitoring the position of an RFID tag, comprising:
    transmitting RF energy to said RFID tag;
    receiving said RF energy in said RFID tag;
    using said RF energy for transmitting short bursts of RF energy from said RFID tag at periodic intervals;
    detecting said short bursts and determining a change in range of said RFID tag; and
    triggering an alarm if said change in range exceeds a predetermined threshold.

* * * * *